S. C. HILLS.
EGG BEATER.
APPLICATION FILED MAR. 10, 1922.

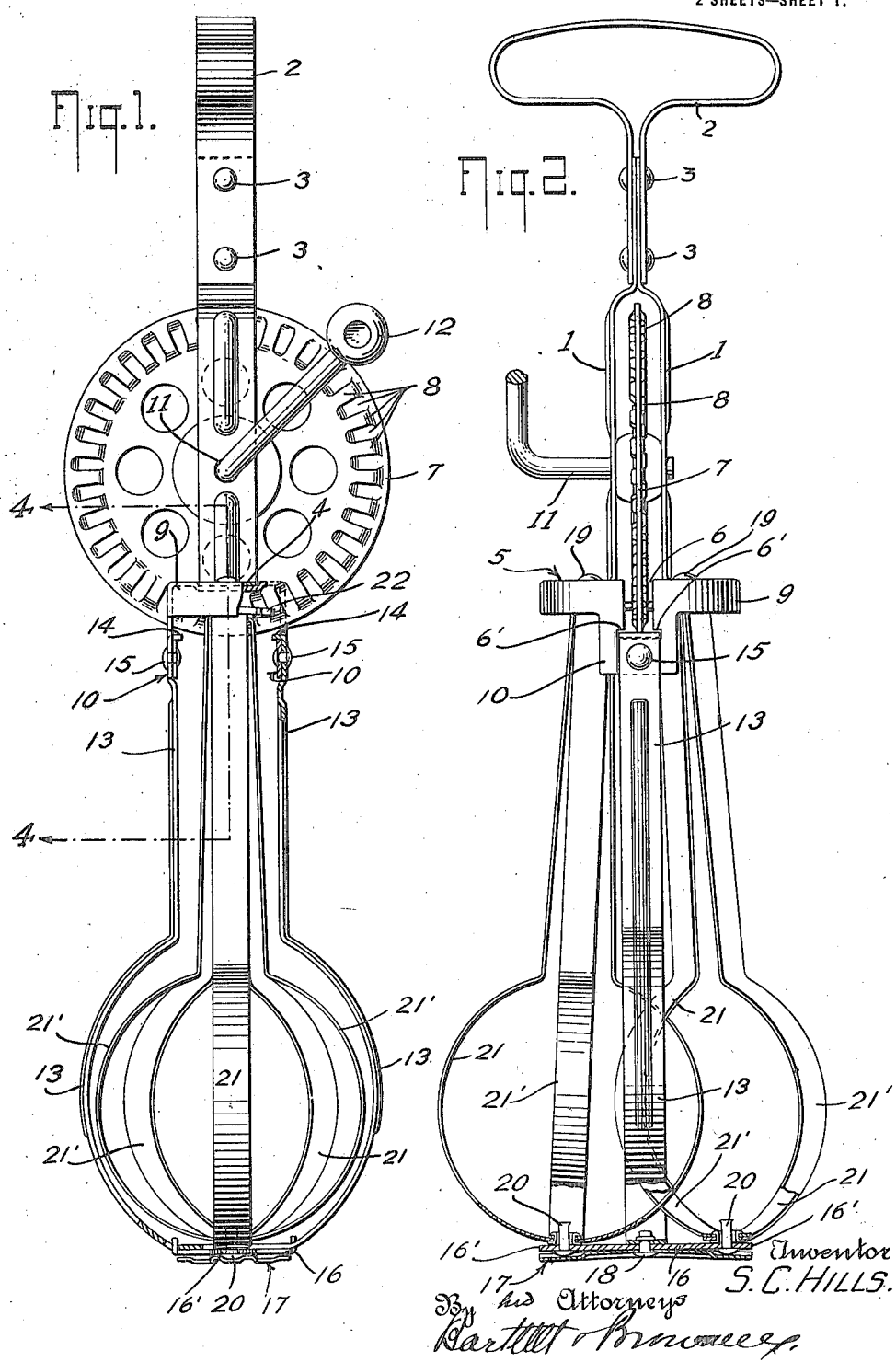

1,433,508.

Patented Oct. 24, 1922.
2 SHEETS—SHEET 2.

Inventor
S.C. HILLS.
By his Attorneys
Bartlett & Brown

Patented Oct. 24, 1922.

1,433,508

UNITED STATES PATENT OFFICE.

SIDNEY C. HILLS, OF TORRINGTON, CONNECTICUT, ASSIGNOR TO THE TURNER & SEYMOUR MANUFACTURING COMPANY, OF TORRINGTON, CONNECTICUT, A CORPORATION OF CONNECTICUT.

EGG BEATER.

Application filed March 10, 1922. Serial No. 542,577.

*To all whom it may concern:*

Be it known that I, SIDNEY C. HILLS, a citizen of the United States, residing at Torrington, county of Litchfield, State of Connecticut, have invented certain new and useful Improvements in Egg Beaters, of which the following is a full, clear and exact description.

My invention relates to improvements in egg beaters and has for its object to produce an improved sheet metal egg beater which is simple in construction and efficient in action. It further has for its object to produce a new means for mounting the rotary beaters, to provide a stationary beater which coacts with the rotary beaters in both sides of their paths of rotation, and to provide a guard for the pinions that are mounted on the movable beaters.

The following is a description of an embodiment of my invention reference being had to the accompanying drawings in which;

Fig. 1 shows a front view of my improved beater;

Fig. 2 shows a side elevation of the same;

Figure 3:
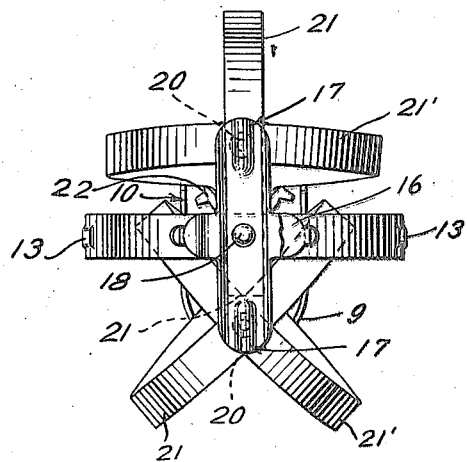
Fig. 3 is a bottom plan view.

Referring more particularly to the drawings 1—1 are two side members of a frame which are secured together and to a handle 2 at their upper ends by rivets 3—3. The lower ends of the members 1 are bent outwardly at right angles to form lugs 4—4 and to these lugs is secured a cross plate 5, having a transverse slot 6, into which extends a drive wheel 7 which is mounted between the side members 1 and has lateral gear teeth 8. The plate 5 has a depending skirt or flange 9 which together with the plate forms a cup shaped guard or housing for pinions hereinafter referred to. The central portions of the lower edge of the sides of this flange are provided with depending extensions 10. The slot 6 extends downwardly part way through the central portions of the extensions 10 as shown in Fig. 2. The drive wheel is provided with a shaft 11 which is mounted to turn in the side members 1—1 and has a forwardly extending portion which is bent to form a crank having an operating handle 12. The lower end of the vertical walls of the portion of the slot 6 extending into the flange extensions 10 are provided with lateral slot extensions 6' through which extend the upper ends of a lower frame 13. These upper ends are bent inwardly at right angles so as to form extended portions 14, which engage the lower wall of the slot 6 and the slot extensions 6'; the portions 14 fitting the slot extensions. The upper ends of the lower frame are secured to the extensions 10—10 by rivets 15, and the portions of the extensions 10 below the slot 6 are depressed to receive the upper ends of the frame. The lower end of the lower frame 13 is provided with a plate 16 riveted thereto and having laterally extending lugs 16'—16'.

The guard plate 5 is riveted to the lugs 4 of the side members 1 of the upper frame by rivets which terminate in downwardly extending bearing pins 19—19, the rivets being in the form of studs passing through the lugs 4 and the plate 5. Secured to the lugs 16' are similar upwardly extending bearing pins 20—20. These pins 20 may be rigidly secured to the lugs 16' as in the construction shown in Fig. 6, or may be movable and held in place by a spring plate 17 pivotally secured by a pivot pin 18 riveted in the frame as shown in Figs. 1 and 2, in which case the upper ends of the pins 20 are slightly headed to prevent their falling out when the ends of the spring plate 17 is swung out of engagement with the pins.

Figure 4:
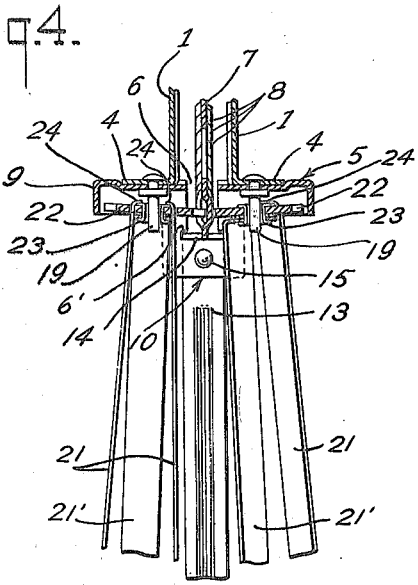
Fig. 4 is a partial section on the line 4—4 of Fig. 1.

Mounted on the pairs of pins 19 and 20 are the upper and lower ends, respectively, of rotary beater members, each of the same comprising two portions 21 and 21'. These portions in each beater member cross each other at the bottom at right angles and at the point of crossing are provided with perforations through which pass eyelets into which the corresponding lower beater bearing pins 20 pass. Each of these pins 20 form a lower bearing for its beating member. The upper ends of the portions 21—21' are secured to pinions 22—22. In order to accomplish this the upper ends of the portions 21' of the beaters are turned inward beneath their respective pinions and an eyelet 23 is passed through perforations in the pinions and in turned portions of each beater member and set so as to hold them together. The upper ends of the portions 21 of each beater member are reduced somewhat and passed through parallel elongated slots in the pinion and then bent down as shown at 24 in Fig. 4. Thus the portions 21 and 21' of each beater are firmly secured to its pinion. The eyelets 23 receive the downwardly depending bearing pins 19, so that the beater members rotate upon the corresponding pins 19 and 20 as bearings. The beater members can be compressed vertically so that they can be removed and reinserted without disassembling the two parts of the egg beater frame for purposes of renewal or repair, or in the construction shown in Figs. 1 and 2 the pins 20 can be dropped out of engagement with the beaters upon turning the spring plate 17 so that the beater members can be removed without bending.

The pinions 22 mesh with the teeth 8 of the drive wheel on opposite sides of the wheel so as to be independently driven thereby. The lower frame is of flat metal and the side portions thereof extend in a direction parallel to the plane passing through the bearing pins 19 and 20 at opposite sides thereof and adjacent the path of rotation of the rotary beater members so that the lower frame coacts with the flat blades of the rotary beater members to increase the beating effect thereof. By using bearing pins mounted as described a bearing member extending longitudinally along the axis of the beater members from end to end is eliminated and with it the tendency of the material being beaten to cling to such longitudinally extending member and thus keep out of the path of the beater blades.

The beater above described is except for the shaft 11, handle 12 and the bearing pins and rivets made of sheet metal, and is easy to manufacture and durable in construction. The rotary members are easily driven, and all the material being beaten is easily brought within their influence. The pinions are concealed from view and protected from contact.

Figure 5:
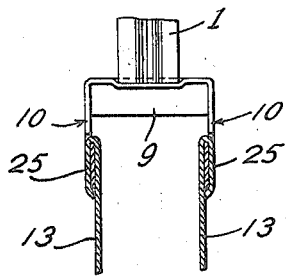
Fig. 5 is a vertical section, partly in elevation, of a modification of a portion of the construction shown in Fig. 4.

In the modification shown in Fig. 5 the upper ends of the lower frame are bent over after passing through the slot extensions at 25 and the riveting of them may be dispensed with.

Figure 6:
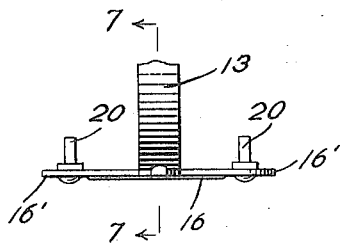
Fig. 6 shows a detail front view of the lower portion of the frame of a beater of a modified construction.
Figure 7:
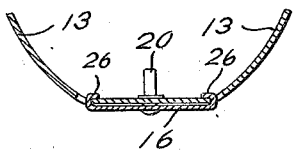
Fig. 7 is a section taken on the line 7—7 of Fig. 6.

In the modification shown in Figs. 6 and 7 the rivets 26 for securing the plate 16 are made in the form of tangs integral therewith that are passed through apertures in the frame and then bent over or riveted.

As will be evident to those skilled in the art, my invention permits of various modifications without departing from the spirit thereof or the scope of the appended claims.

What I claim is:

1. In an egg beater, the combination of an upper frame, two rotary pinion-bearing beater members and a drive gear mounted thereon, and a cup shaped guard having a depending flange surrounding the pinions of said beater members, said pinions meshing with said drive gear on opposite sides thereof, said depending flange having oppositely located downwardly extending projections from the lower edge of said flange, and a lower frame secured to said projections and supporting the lower ends of said beater members.

2. In an egg beater, the combination of an upper frame, two rotary pinion-bearing beater members and a drive gear mounted thereon, and a cup shaped guard having a depending flange surrounding the pinions of said beater members, said pinions meshing with said drive gear on opposite sides thereof, said depending flange having oppositely located, downwardly extending projections from the lower edge of said flange, and a lower frame secured to said projections and supporting the lower ends of said beater members, said lower frame having at its upper ends inwardly extending portions passing through said projections.

3. In an egg beater, the combination of an upper frame, two rotary pinion-bearing beater members and a drive gear mounted thereon, a lower frame supporting the lower ends of said beater members, the pinions on said beater members having central perforations and said upper frame having downwardly projecting pins entering said perforations, said beater members and pinions being adapted to be removed from said pins.

4. In an egg beater, the combination of an upper frame, two rotary pinion-bearing beater members and a drive gear mounted thereon, a lower frame supporting the lower ends of said beater members, the pinions on said beater members having central perforations and said upper frame having downwardly projecting pins entering said perforations, said lower frame having upwardly projecting pins entering perforations in the lower ends of said beater members, said beater members and pinions being adapted to be removed from said pins.

5. In an egg beater the combination of an upper frame, two rotary pinion-bearing beater members and a drive gear mounted thereon, a lower frame supporting the lower ends of said beater members, said lower frame comprising a flat strip lying outside and adjacent to the path of said beater members on both sides thereof and extending laterally in a direction parallel to the plane passing through the bearings of said rotary members.

6. In an egg beater the combination of an upper frame, two rotary pinion-bearing beater members and a drive gear mounted thereon, a lower frame supporting the lower ends of said beater members, said pinions being journaled on said upper frame, and movable upwardly projecting pins forming bearings for the lower ends of said beater members, and a pivoted plate holding said pins in normal position in engagement with said beater members.

7. In an egg beater the combination of a pair of rotary beater members provided with blade portions having intersecting paths of movement, a frame on which the beater members are mounted having flattened blade portions arranged at opposite sides of the beater members and in planes adjacent planes tangent to the paths of movement of both of said blade portions of the beater members and midway between the axes of the beater members, and means for rotating the beater members.

8. In an egg beater the combination of a frame, two rotary pinion bearing beater members and a drive gear mounted thereon, bearing pins connecting the ends of the beater members and frame about the axes of which the beater members are mounted for rotation, said beater members and pins constructed and arranged to permit the beater members and pinions to be removed from the frame.

SIDNEY C. HILLS.